United States Patent

[11] 3,619,669

[72] Inventor Richard D. Wheeler
Norco, Calif.
[21] Appl. No. 39,953
[22] Filed May 20, 1970
[45] Patented Nov. 9, 1971
[73] Assignee The United States of America as represented by the Secretary of the Navy

[54] PULSED DIGITAL DELAY
4 Claims, 2 Drawing Figs.

[52] U.S. Cl. .......... 307/293, 307/106, 307/208, 307/225, 328/41, 328/56, 331/108 B, 331/135
[51] Int. Cl. .......... H03k 17/28
[50] Field of Search .......... 307/106, 220, 225, 226, 293, 208; 328/41, 56, 66, 67; 331/108 B, 135

[56] References Cited

UNITED STATES PATENTS

| | | | |
|---|---|---|---|
| 3,139,594 | 6/1964 | Ressler .......... | 328/66 X |
| 3,235,745 | 2/1966 | Szarvas .......... | 307/225 X |
| 3,374,359 | 3/1968 | Anderson .......... | 307/225 X |

*Primary Examiner*—Donald D. Forrer
*Assistant Examiner*—R. C. Woodbridge
*Attorneys*—R. S. Sciascia and J. M. St. Amand

ABSTRACT: A pulsed digital delay circuit using a pair of pulsed oscillators for generating extremely accurate, jitter free, continuously adjustable delay for pulse-timing circuits, and which can be synchronized with other system-timing pulses.

The invention herein described may be manufactured and used by or for the Government of the United States of America for governmental purposes without the payment of any royalties thereon or therefor.

RICHARD D. WHEELER
INVENTOR.

BY J. M. St. Amand
ATTORNEY

PULSED DIGITAL DELAY

BACKGROUND OF THE INVENTION

The invention relates to pulse-generating delay circuits. Delay circuits have been produced using monostable multivibrators (one-shots), voltage controlled delays, lumped constant lines, or counters. For long delays (e.g. several hundred microseconds) these prior delay circuits have limitations. The one-shots tend to jitter and the delays can be affected by associated pulse coupling. Voltage controlled delays require extremely accurate and stable references. Lumped constant lines are expensive and large physically. If a free running oscillator is used the counter output will jitter. This occurs because many oscillators, such as crystal types, cannot be easily synchronized with timing pulses.

SUMMARY OF THE INVENTION

An object of this invention is to provide a simple means for generating long pulse delays which are: stable, jitter free, synchronized with other system pulses, variable, and compact.

The pulsed digital delay circuit described herein provides extremely accurate, jitter free adjustable delay for pulse timing circuits. The delay times can vary from a few microseconds to thousands of microseconds. The present invention overcomes the disadvantages of the prior delay circuits.

This circuit is particularly applicable to radar systems having a linear FM pulse compression mode using dispersive delay lines and a normal pulse mode. For linear FM mode operation, the delay from a synchronizer trigger pulse to the transmit time must equal the dispersive delay line time and for normal pulse mode operation the delay from the synchronizer trigger pulse to the transmit time must equal twice the dispersive delay line time (e.g. where the dispersive line signal delays are approximately 200 μsec. one way the normal mode delay must be 400 μsec.). Any jitter or nonstability would result in range error. The present pulsed digital delay circuit eliminates any range error.

The simplicity of the pulsed digital delay circuit along with its variable delay capability is an improvement over existing prior circuits, and is particularly useful wherever long, stable and jitter free delays are required.

BRIEF DESCRIPTION OF THE DRAWINGS

Other objects and many of the attendant advantages of this invention will become readily appreciated as the same becomes better understood by reference to the following detailed description when considered in connection with the accompanying drawings wherein.

Figures 1, 2:
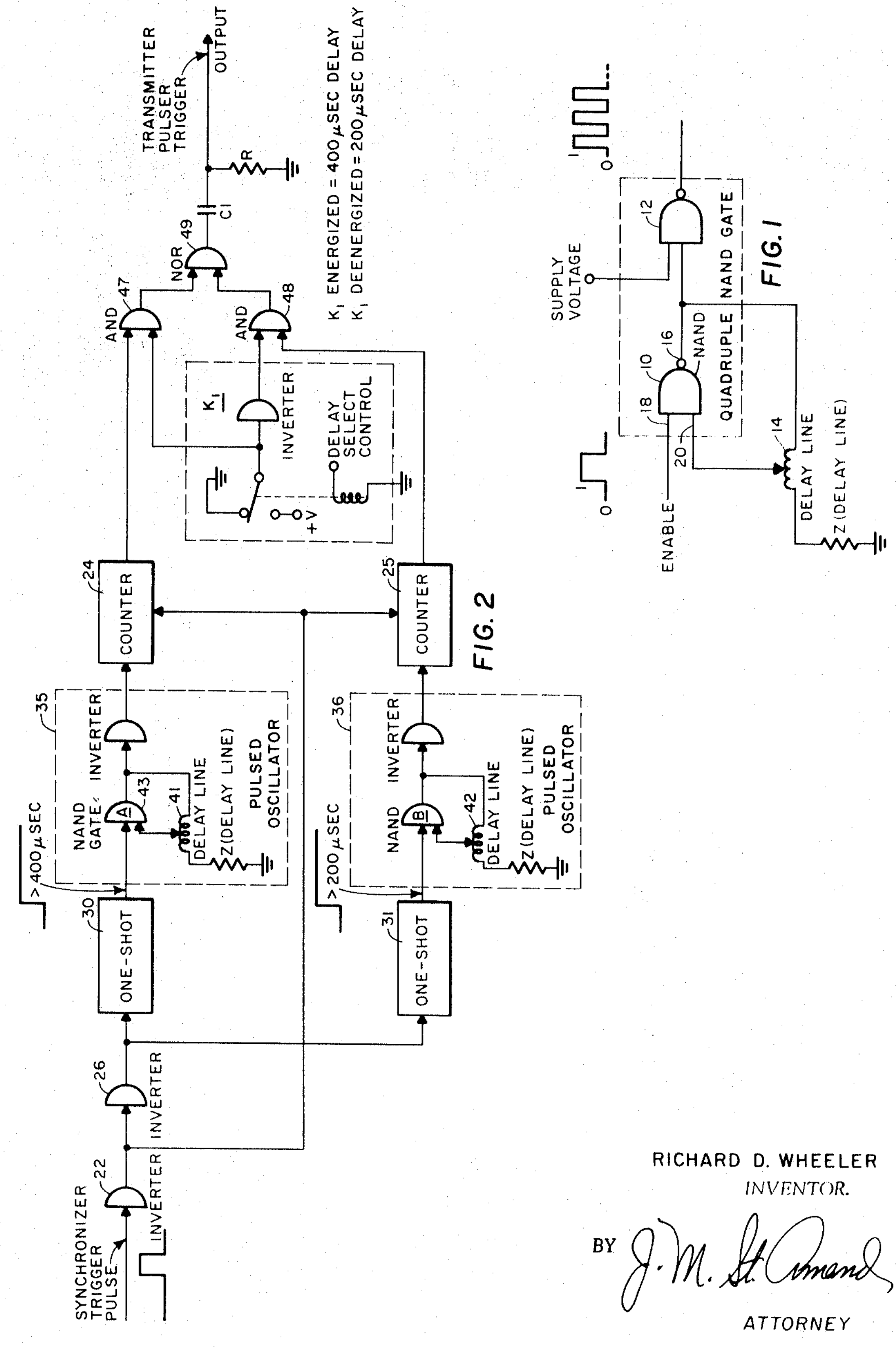
FIG. 1 is a circuit diagram of a simple improved pulsed oscillator.
FIG. 2 is a circuit diagram showing a preferred embodiment of the pulsed digital delay circuit of this invention using a pair of simple pulsed oscillators as shown in FIG. 1.

The simple pulsed oscillator shown in FIG. 1 uses only one NAND-gate 10 of a quadruple two-input NAND gate and a delay line 14. The second gate 12 of the quadruple two-input NAND gate is used as an inverter to flip the signal-out by 180°. Where it is not desired to invert the signal-out only a single 2-input NAND-gate 10 is necessary. Turn-on and turnoff of the circuit occur in exact coincidence with NAND-gate 10, thus eliminating any range error or jitter.

With the enable line 18 input at a logical ZERO, the output 16 of NAND-gate 10 is a logical ONE and the oscillator is turned off. Whenever the enable line 18 input rises to a logical ONE, NAND-gate 10 output 16 falls, to ZERO, and delay line (microseconds) time later this ZERO is fed back (via delay line 14) to input 20 of gate 10, turning off the NAND gate. This cycle is repeated, sustaining oscillations, as long as the enable line input 18 is high. The oscillator frequency can be determined by the equation $f=\frac{1}{2}d$, where $f$ = MHz. and $d$ = delay-line time in microseconds. The upper frequency limit is about 20 MHz.

The pulsed oscillator of FIG. 1 is used in the pulsed digital delay circuit of FIG. 2, as shown. The synchronizer trigger pulse is fed into an inverter 22 to get a counter reset pulse of desired polarity, which in turn is fed to counters 24 and 25 (eight-stage counters, for example) and to inverter 26 (to obtain desired signal polarity) whose output is used to trigger one-shot 30 and one-shot 31. The on-time of one-shots 30 and 31 is not critical, provided the on-time exceeds the desired delay time. The outputs of one-shots 30 and 31 are connected to previously described simple pulsed oscillators 35 and 36, respectively. The turn-on and turnoff of pulsed oscillators occur in exact coincidence with their respective one-shot 30, 31 enable gates. One-shot 30 is set to exceed 400 μsec, for example, and one-shot 31 is set to exceed 200 μsec., for example. With the enable lines from one-shots 30 and 31 to NAND gate A and NAND gate B, respectively, of pulsed oscillators 35 and 36, at a logical ZERO, the outputs of NAND gates A and B are each a logical ONE and pulsed oscillators 35 and 36 are turned off. Whenever the enable line from a one-shot 30 or 31 rises to a logical ONE, the respective output from NAND gate A or B falls to zERO, and respective delay line time later, due to delay lines 41 or 42, this ZERO is fed back to the respective second NAND gate input 43 or 44 turning off the NAND gate. For each oscillator 35 and 36, this cycle is repeated, sustaining oscillation, as long as the input from the one-shot to the NAND gate is high.

The outputs of oscillators 35 and 36 are fed to counters 24 and 25, respectively. The output of counter 24 is fed to AND-gate 47 and the output of counter 25 is fed to AND-gate 48 for delay selection by a relay K, and associated circuitry. The outputs of AND-gate 47 and AND-gate 48 are connected to NOR-gate 49. The selected delay is fed from NOR-gate 49 to a differentiator circuit, formed by capacitor $C_1$ and resistor $R_1$, and the resulting trigger is fed out as a pulser trigger. Delay lines 41 and 42 are adjustable and can be varied to achieve the exact delay required.

Counters 24 and 25 each count a desired number of output pulses from oscillators 35 and 36 respectively until the desired delay is reached, at which time they deliver an output pulse. A pulse from inverter 22 resets the counters to repeat the cycle.

What is claimed is:

1. A pulsed digital delay circuit for generating two accurate, jitter-free adjustable delay pulses from a synchronizer trigger pulse, comprising
   - a. first and second one-shot circuits whose on-times at least exceed desired delay time,
   - b. first and second simple pulsed oscillator means whose turn-on and turnoff times occur in exact coincidence with said first and second one-shot circuits, respectively, the outputs of said first and second one-shot circuits connected to respective inputs to said first and second pulsed oscillator means, said first and second pulsed oscillator means each having different delay times,
   - c. first and second counter means connected to respective outputs of said first and second pulsed oscillator means,
   - d. the outputs of said first and second counters fed into first and second AND gates, respectively,
   - e. a synchronizer trigger pulse fed to said first and second one-shot circuits, and also to said first and second counter means as a counter reset pulse,
   - f. means for selection of said first and second AND gates,
   - g. the output of the selected one of said AND gates being fed to a differentiator circuit whose output in turn is a pulser trigger output suitable for synchronization with other system pulses.

2. A circuit as in claim 1 wherein said simple pulsed oscillator means comprises:
   - a. a two input NAND gate,
   - b. the first input to said two input NAND gate connected to the output of said respective one-shot circuit,
   - c. an adjustable delay line,
   - d. the output of said NAND gate being fed through said delay line to the second input to said two input NAND gate for controlling said gate.

3. A circuit as in claim 1 wherein said simple pulsed oscillator means comprises:

a. a quadruple two-input NAND gate, b. the first gate of said quadruple two-input NAND gate being used as a NAND gate and the second gate thereof being used as an inverter, c. the output of said respective one-shot circuit being connected to the first input to said first NAND gate of aid quadruple gate, d. an adjustable delay line, e. the output of said NAND gate being fed through said delay line to the second input to said first gate of said quadruple gate for controlling said first gate, such that when the output of said one-shot circuit is at a logical ZERO, the output of said NAND gate is a logical ONE and the oscillator is turned off, and when the output of the one-shot circuit rises to a logical ONE, the NAND gate output falls to ZERO and delay time later, as determined by said delay line, this ZERO is fed to said second input to said first gate turning off said NAND gate.

4. A circuit as in claim 1 wherein the delay time of said first pulsed oscillator means being twice that of said second pulsed oscillator means.

* * * * *